United States Patent

Wagner, Jr et al.

Patent Number: 5,289,624
Date of Patent: Mar. 1, 1994

[54] RETRACTOR SERVICE REPLACEMENT METHOD

[75] Inventors: Karl F. Wagner, Jr, Brighton; Kevin S. O'Neil, Livonia; Doyle E. Brown, Rochester Hills, all of Mich.

[73] Assignees: Takata Inc., Auburn Hills; General Motors Corporation, Detroit, both of Mich.

[21] Appl. No.: 890,567

[22] Filed: May 28, 1992

[51] Int. Cl.⁵ .................. B23P 6/00; B23P 19/04
[52] U.S. Cl. .......................... 29/402.08; 29/402.14
[58] Field of Search .......... 29/402.01, 402.03, 402.04, 29/402.08, 402.09, 402.14; 24/630, 631, 632, 633, 697.1, 697.2; 280/801, 808; 297/468, 474, 475, 482, 483, 484, 486

[56] References Cited

U.S. PATENT DOCUMENTS 1,376,529  5/1921  Grant .................. 29/402.08 X
4,822,104  4/1989  Plesniarski .................. 297/468

Primary Examiner—Timothy V. Eley
Attorney, Agent, or Firm—Fitch, Even, Tabin & Flannery

[57] ABSTRACT

A method for replacing a single retractor in a vehicle seat belt system of the type having two retractors, each retractor winding a belt having an end extending through a belt slot of a latch member and sewn to itself, said method comprising the steps of: cutting the belt end of the one belt wound by the one retractor which is to be replaced so that the one retractor and one belt may be disassembled from the vehicle while the other retractor and its belt remain installed in the vehicle; installing a replacement retractor winding a belt having a belt end carrying a hook member; hooking the hook member through the belt slot of the latch member; and permanently installing a keeper member on the hook member to prevent the subsequent unhooking of the hook member from the latch member.

3 Claims, 1 Drawing Sheet

RETRACTOR SERVICE REPLACEMENT METHOD

This invention relates to a method and apparatus for replacing a single retractor in a seat belt system of the type having two retractors winding separate belts permanently sewn to a latch plate.

BACKGROUND OF THE INVENTION

It is well known in motor vehicle seat belt systems to provide both lap and shoulder belts for restraining an occupant in the seat.

One well known seat belt system includes separate lap and shoulder belt retractors which respectively wind the shoulder belt and the lap belt. The shoulder belt and the lap belt each have a belt end which is permanently attached to a latch member by having the ends of the belt pass through a slot in the latch member and the belt ends then being sewn to themselves. A disadvantage of the aforedescribed two retractor seat belt system is that the entire belt system, including both retractors, must be removed from the vehicle and replaced in the event that either one of the retractors requires service.

It would be desirable to provide a method and apparatus by which the aforedescribed seat belt system could be serviced in a manner by which only the retractor needing service would be replaced, while the other retractor would remain installed on the vehicle.

SUMMARY OF THE INVENTION

A method for replacing a single retractor in a vehicle seat belt system of the type having two retractors, each retractor winding a belt having an end extending through a belt slot of a latch member and sewn to itself, said method comprising the steps of: cutting the belt end of the one belt wound by the one retractor which is to be replaced so that the one retractor and one belt may be disassembled from the vehicle while the other retractor and its belt remain installed in the vehicle; installing a replacement retractor winding a belt having a belt end carrying a hook member; hooking the hook member through the belt slot of the latch member; and permanently installing a keeper member on the hook member to prevent the subsequent unhooking of the hook member from the latch member.

The latch member is preferably a stamped metal J-shaped hook which is hooked through the belt slot of the latch member. The keeper member is preferably a molded plastic block. The J-shaped hook and the plastic block each have at least one set of aligned apertures and a rivet is installed through the aligned apertures to permanently attach the keeper member to the J-shaped hook so that the J-shaped hook cannot be disassembled from the latch member by the vehicle user.

BRIEF DESCRIPTION OF THE DRAWINGS

These and other objects, features and advantages of the invention will become apparent upon consideration of the description of the preferred embodiment and the appended drawings in which.

DETAILED DESCRIPTION OF THE PREFERRED EMBODIMENT

Figure 1:
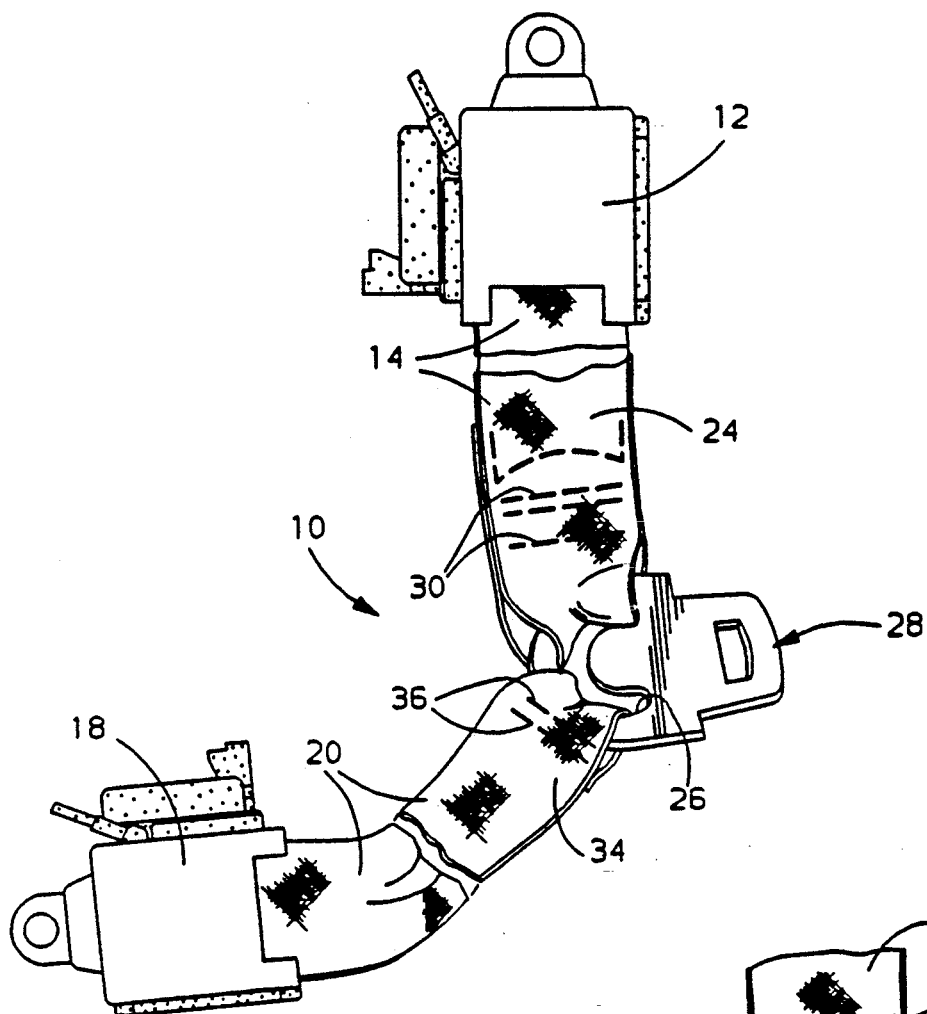
FIG. 1 shows a seat belt system including a lap belt and a shoulder belt, winding belts which are permanently sewn to a latch member.

FIG. 1 shows a conventional seat belt system 10 of the type having a shoulder belt retractor 12 winding a shoulder belt 14 and lap belt retractor 18 winding a lap belt 20. The retractors 12 and 18 are suitably bolted to a vehicle body, now shown. The shoulder belt 14 includes a belt end 24 which passes through a belt slot 26 of latch member 28. The end of the belt 24 is folded back upon itself and attached by rows of stitches 30. Likewise, the lap belt 20 has a belt end 34 which passes through the belt slot 26, is double back on itself, and permanently attached by rows of stitches as at 36.

The present invention provides methods and apparatus by which either one of the retractors can be replaced without replacing the other retractor. According to the method, and using replacement of the lap belt retractor 18 as an example, the belt end 34 of the lap belt 20 is cut away from the latch member 28 using either scissors or a knife. Then, the lap belt retractor 18 may be unbolted from the vehicle while the shoulder belt retractor 12 and the latch member 28 remain in the vehicle.

Figure 2:
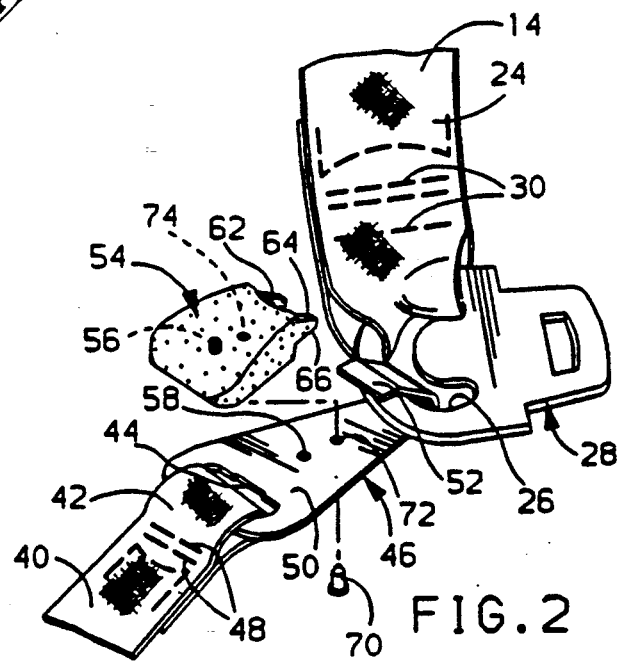
FIG. 2 is a view similar to FIG. 1 but showing the lap belt retractor having been cut away from the latch member, and a hook member of a replacement retractor hooked through the belt slot of the latch member.
Figure 3:
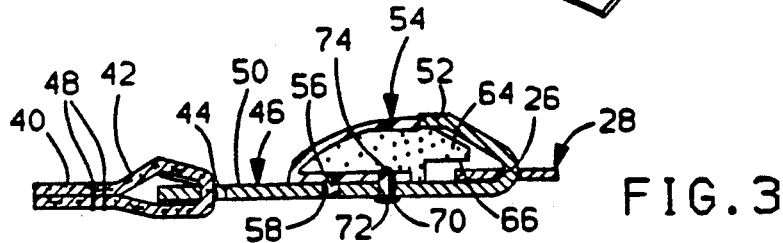
FIG. 3 shows the permanent attachment of the molded plastic keeper member installed to prevent disassembly of the hook member from the latch member.

In FIG. 2 a replacement lap belt retractor, now shown, carries a lap belt 40 having a belt end 42, which extends through a belt slot 44 of a hook member 46. The belt end 42 is folded back on itself and permanently attached to the hook member by rows of stitches as at 48. This sewing of the lap belt 40 to the latch member 46 occurs at the seat belt manufacturer. As best seen in FIGS. 2 and 3, the hook member 46 is a sheet metal stamping, and includes a base 50 and a reversely bent hook 52.

As seen in FIG. 2, the hook 52 is hooked through the belt slot 26 of the latch member 28. Then, a keeper member 54 is attached to the base plate 50 to block the opening of the hook 52 so that the hook member 46 cannot be disconnected from the latch member 28. The keeper member 54 is preferably a block of molded plastic and has an integral locating tab 56 molded therein which depends from the bottom surface thereof, and seats within an aperture 58 of the base 50 of the hook member 46. This engagement of the integral tab 56 in the aperture 58 properly locates the keeper member 54 in a manner by which a pair of arms 62 and 64, projecting forward from the keeper member 54, become engaged beneath the hook 52 of the hook member 46 and define an abutment surface 66 which overlies the latch plate 28. The extent of the space between the arms 62 and 64 define the degree of freedom of movement between the hook member 46 and the latch member 28 to fit closely about the restrained seat occupant. The keeper member 54 is permanently attached to the latch member 46 by installing a rivet 70 or other suitable fastener through an aperture 72 provided in the base plate 52, and an aligned aperture 74 defined in the underside of the keeper 54.

Thus, it is seen that the invention provides a new and improved method and apparatus enabling the replacement of a single one retractor of a seat belt system having two retractors. Either the lap belt retractor or the shoulder belt retractor may be replaced in this manner. The keeper member 54 is designed and stylized to provide an aesthetically pleasing finished assembly. It will be understood that the keeper member may be attached to the latch member by any known fastener, such a fastener preferably being of the type which cannot be removed by the vehicle user. Other modifications may be made to this method and apparatus within the experience of the persons of ordinary skill in the art, and within the scope and intent of the appended claims.

What is claimed is:

1. A method for replacing a single retractor in a vehicle seat belt system of the type having two retractors, each retractor winding a belt having an end extending through a belt slot of a latch member and sewn to itself, said method comprising the steps of:

cutting the belt end of the one belt wound by the one retractor which is to be replaced so that the one retractor and one belt may be disassembled from the vehicle, while the other retractor remains installed in the vehicle;

installing a replacement retractor winding a belt having a belt end carrying a hook member;

hooking the hook member through the belt slot of the latch member; and permanently installing a keeper member on the hook member to prevent the subsequent unhooking of the hook member from the latch member.

2. The method of claim 1 in which the hook member is a stamped, metal J-shaped hook, and the keeper member is a molded plastic block.

3. The method of claim 2 in which the keeper member is permanently installed on the hook member by installing a rivet through aligned holes in the hook member and the keeper member.

* * * * *